(12) United States Patent
Cook

(10) Patent No.: US 12,217,140 B2
(45) Date of Patent: Feb. 4, 2025

(54) APPARATUS AND METHOD FOR PREDICTING DOWNHOLE CONDITIONS

(71) Applicant: David Cook, Lakeway, TX (US)

(72) Inventor: David Cook, Lakeway, TX (US)

(*) Notice: Subject to any disclaimer, the term of this patent is extended or adjusted under 35 U.S.C. 154(b) by 0 days.

(21) Appl. No.: 17/968,077

(22) Filed: Oct. 18, 2022

(65) Prior Publication Data
US 2024/0127108 A1    Apr. 18, 2024

(51) Int. Cl.
*G06N 20/00*    (2019.01)
(52) U.S. Cl.
CPC ................... *G06N 20/00* (2019.01)
(58) Field of Classification Search
None
See application file for complete search history.

(56) References Cited

U.S. PATENT DOCUMENTS

| | | | |
|---|---|---|---|
| 2006/0157282 A1* | 7/2006 | Tilton | E21B 21/08 175/426 |
| 2021/0042634 A1 | 2/2021 | Maucec | |
| 2021/0110280 A1 | 4/2021 | Akkurt | |
| 2021/0285321 A1* | 9/2021 | Verma | E21B 21/003 |
| 2021/0363871 A1* | 11/2021 | Samuel | E21B 47/00 |
| 2022/0127940 A1* | 4/2022 | McClure | E21B 43/26 |
| 2023/0095708 A1* | 3/2023 | Wesley | E21B 47/10 175/40 |

FOREIGN PATENT DOCUMENTS

WO    WO-2020097060 A2 *    5/2020    ............ E21B 43/26

* cited by examiner

*Primary Examiner* — David R Vincent
(74) *Attorney, Agent, or Firm* — Caldwell Intellectual Property Law

(57) ABSTRACT

In an aspect, an apparatus for predicting downhole conditions is disclosed. The apparatus comprises at least a processor and a memory communicatively connected to the at least a processor. The memory containing instructions configuring the at least a processor to receive a condition datum. The memory additionally contains instructions configuring the at least a processor to produce a measured downhole condition using at least a sensor. The memory instructs the processor to convert the condition datum and the measured downhole conditions into a cleansed data format using a data conversion module. The processor is instructed by the memory to identify a flagged data as a function of the cleansed condition datum and the cleansed measured downhole conditions using a downhole machine learning model. The memory instructs the processor to generate a predicted downhole condition as a function of the flagged data.

14 Claims, 8 Drawing Sheets

APPARATUS AND METHOD FOR PREDICTING DOWNHOLE CONDITIONS

FIELD OF THE INVENTION

The present invention generally relates to the field of oil wells. In particular, the present invention is directed to an apparatus and method for predicting downhole conditions.

BACKGROUND

Predicting downhole conditions has been notoriously difficult for experts in the field. Previous methods were time consuming, laborious, and impractical. Through the use of artificial intelligence, predictions of downhole conditions may become more effective and efficient.

SUMMARY OF THE DISCLOSURE

In an aspect, an apparatus for predicting downhole conditions is disclosed. The apparatus comprises at least a processor and a memory communicatively connected to the at least a processor. The memory containing instructions configuring the at least a processor to receive a condition datum. The memory additionally contains instructions configuring the at least a processor to produce a measured downhole condition using at least a sensor. The memory then instructs the processor to convert the condition datum and the measured downhole conditions into a cleansed data format using a data conversion module, wherein the cleansed data format comprises a cleansed condition datum and a cleansed measured downhole condition. The processor is then instructed by the memory to identify a flagged data as a function of the cleansed condition datum and the cleansed measured downhole conditions using a downhole machine learning model. Finally, the memory instructs the processor to generate a predicted downhole condition as a function of the flagged data.

In another aspect, a method for predicting downhole conditions is disclosed. The method includes receiving, using at least a processor, a condition datum. The method then includes producing, using the at least a processor, a measured downhole condition using at least a sensor. Then the method converts, using the at least a processor, the condition datum and the measured downhole conditions into a cleansed data format using a data conversion module, wherein the cleansed data format comprises a cleansed condition datum and a cleansed measured downhole condition. The method additionally identifies, using the at least a processor, a flagged data as a function of the cleansed condition datum and the cleansed measured downhole conditions using a downhole machine learning model. Finally, the method includes generating, using the at least a processor, a predicted downhole condition as a function of the flagged data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for predicting downhole conditions is disclosed. The apparatus includes at least a processor and a memory communicatively connected to the at least a processor. The memory may contain instructions configuring the at least a processor to receive a condition datum. The memory may additionally contain instructions configuring the at least a processor to produce a measured downhole condition using at least a sensor. The memory may then instruct the processor to convert the condition datum and the measured downhole conditions into a cleansed data format using a data conversion module, wherein the cleansed data format comprises a cleansed condition datum and a cleansed measured downhole condition. The processor may then be instructed by the memory to identify a flagged data as a function of the cleansed condition datum and the cleansed measured downhole conditions using a downhole machine learning model. Finally, the memory may instruct the processor to generate a predicted downhole condition as a function of the flagged data. Exemplary embodiments illustrating aspects of the present disclosure are described below in the context of several specific examples.

Figure 1:
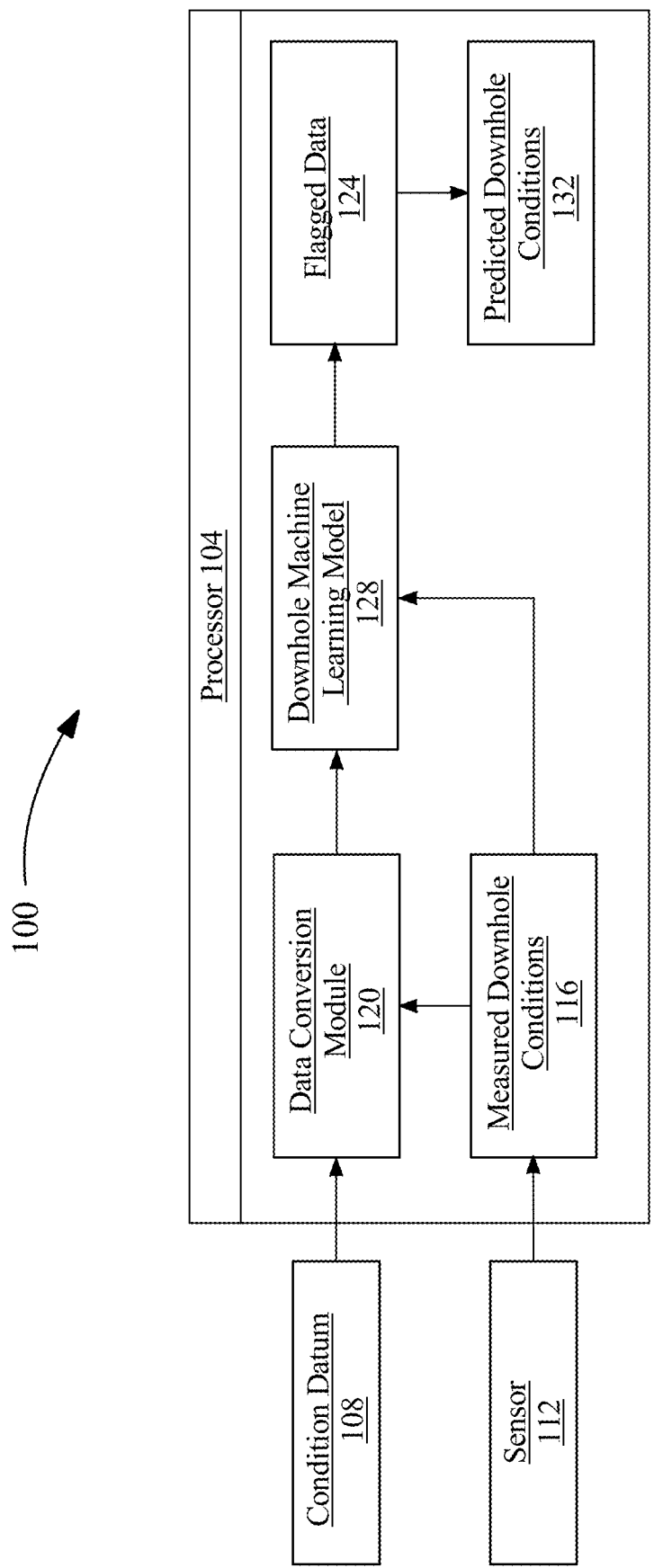
FIG. 1 is a block diagram of an exemplary embodiment of an apparatus for predicting downhole conditions.

Referring now to FIG. 1, an exemplary embodiment of an apparatus 100 for predicting downhole conditions is illustrated. System includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 104 may be configured to receive a condition datum 108. As used in the current disclosure, a "condition datum" is an element of datum related surface conditions of near the well. Surface conditions refer to any conditions that do not occur downhole. These conditions may include status and geometry data related to drilling equipment, equipment for maintaining hole structure, geography of the area of the well, and the like. Examples of surface conditions include system geometry, geographical information, temporal information, current operation datum. Condition datum 108 may be received from a user or a drilling entity. Condition datum 108 may be received from a database. In some embodiments, a condition datum may be generated using a v-lookup table. Condition datum may be generated and/or detected using a plurality of condition datum sensors. Condition datum sensors may be configured to sense system geometry, geographical information, temporal information, current operation datum, and the like. Condition datum sensors may comprise global positioning systems, cameras, time measurement devices, pressure sensors, viscosity sensors, temperature sensors, and the like.

With continued reference to FIG. 1, condition datum 108 may include system geometry. As used in the current, disclosure, "system geometry" refers to the size, shape, and design of equipment used to create the well. Equipment may include sucker rods, casting, cement lining, annulus, production tubing, pumps, and the like. Examples of system geometry may include length, diameter, and/or perforation diameter within production tubing or casting. In embodiments, system geometry may also include materials and the process used to make and or install the production tubing or casting. In some embodiments, production tubing is run into the drilled well after the casing is run and cemented in place. Production tubing may protect wellbore casing from wear, tear, corrosion, and deposition of by-products, such as sand/silt, paraffins, and asphaltenes. System geometry may additionally include the size, shape, pattern, and number of holes within the production tubing. System geometry may additionally include a well path/trajectory.

With continued reference to FIG. 1, condition datum 108 may include geographical information. As used in the current, disclosure, "geographical information" refers to geography of the well. In an embodiment, geographical information may include information relating to the geography of the well as it relates to other wells, the surface, and/or geographic points of interest. Geographical information may include the height of the well relative to sea level. Geographic information may include the location of the well as it relates to other equipment or the reservoir. Geographic information may also comprise general information regarding the well such as the size of the oil well, location, type of oil well, reservoir rock conditions, depth of oil well, age of oil well, and the like.

With continued reference to FIG. 1, condition datum 108 may include temporal information. As used in the current, disclosure, "temporal information" refers to the time the target well being analyzed with respect to previous wells and their treatments in the field. Temporal information may reference to stage of the drilling process in which the target well and the previous well are being evaluated. Temporal information may also reference the actual time between the analysis of the target well with respect to the previous wells.

With continued reference to FIG. 1, condition datum 108 may include current operation datum. As used in the current, disclosure, "current operation datum" is an element of datum related to the output of the well. In an embodiment, current operation datum may include the fluid properties of output of the well. In a non-limiting example, fluid properties may include the pump rate, viscosity, temperature, fluid phase (i.e. liquid, solid, or gas), depth, pressure, composition, historical migration, type of geological trap, and reservoir heterogeneity (that is, varying rock properties).

With continued reference to FIG. 1, processor 104 may be communicatively connected to one or more sensors 112. As used in this disclosure, a "sensor" is a device that is configured to detect a phenomenon and transmit information related to the detection of the phenomenon. For example, in some cases a sensor may transduce a detected phenomenon, such as without limitation, current, speed, direction, force, torque, moisture, temperature, pressure, geographic location, resistance, touch sensors, viscosity, fluid state, fluid density, and the like, into a sensed signal. Sensor 112 may include one or more sensors which may be the same, similar, or different. Sensor 112 may include one or more sensor suites with sensors in each sensor suite being the same, similar, or different. A sensor 112 may be located downhole.

Still referring to FIG. 1, at least a sensor 112 may include a plurality of sensors. In an embodiment, sensor 112 may include a temperature sensor, accelerometer, gyro meter, pressure sensor, GPS, speed gauge, voltage sensors, current sensors, ohm sensors, touch sensors, viscosity sensor, motion sensor, density sensor, flow rate sensor, downhole gauge, electricity usage meter, multimeters, a carbon emissions sensor, natural gas sensor, image sensor, scale, materials sensor, micro seismic geophones, fiber optic sensors, radiation sensors, rotational sensors, venturi flow meters, and the like.

Still referring to FIG. 1, at least a sensor 112 may be used to produce measured downhole conditions 116. As used in the current disclosure, a "measured downhole condition" is an element of datum that reflects downhole conditions that is gathered using sensor 112. As used in the current disclosure, "downhole conditions" refer to any event, occurrence, status, that occurs downhole. Examples of downhole conditions may include temperature, pressure, force, motion, and the like. Measured downhole conditions may be taken from wells that are similarly situated to the target well. Well may be similarly situated as a function of condition datum, well geography, or other circumstances. In an embodiment, measured downhole conditions 116 may include hydrostatic pressure, formation pressure, fracture pressure, bottomhole pressure, formation integrity test, equivalent circulating densities, differential pressure, bottomhole frac gradient, pressure transients, rate transients, and the like. Bottomhole pressure (or downhole pressure) is the pressure measured at the bottom of the hole in pounds per square inch (psi). Bottomhole pressure maybe the sum of the different pressures acting downhole or at the bottom of the drilled hole. Pressure transients may be an evaluation of the change of bottomhole pressure or reservoir pressure over a period of time. Rate transient may include an analysis of better understand the capacity of well and/or reservoir. In some embodiments, both the rate transients and pressure transients may be used to predict the future behavior of bottomhole pressure and rate production of the well and/or reservoir. For non-flow conditions, the downhole pressure is caused by the hydrostatic pressure exerted by the fluid in the wellbore and surface pressure. For flow conditions, when wellbore fluid is being circulated, it is the sum of the hydrostatic pressure and the friction pressure drop in the annulus. Measured downhole conditions 116 may be a measurement of density of the output of the tank in pounds per gallon (ppg) or kilograms per cubic meter (kg/m3) and pressure measurement in pounds per square inch (psi) or bar or pascal (Pa). Pressure increases with fluid density. Measured downhole conditions 116 may also encompass the amount of pressure fluid of a known density exerts per unit length, this is known as the pressure gradient. The pressure gradient is defined as the pressure increase per unit of depth due to its density and it is usually measured in pounds per square inch per foot or bars per meter.

With continued reference to FIG. 1, processor 104 may be configured to convert the condition datum 108 and the measured downhole conditions 116 using a machine-learning module, such as data conversion module 120, into a cleansed data format. As used in this disclosure, a "cleansed data format" is a format and/or structure for data where the data is transformed from an unprocessed format and/or structure into a processed format and/or structure that is prepared for use in the generation and training of an artificial intelligence (AI) model, for example a machine learning model, a neural network, and the like. A condition datum 108 that is placed into a cleansed data format may be referred to as a cleansed condition datum. Similarly, measured downhole conditions 116 that is placed in a cleansed data format may be referred to as cleansed measured downhole conditions. A cleansed data format may be used to ensure data used for the generating and training of the AI model is relevant and accurate to generate an optimal AI model. A cleansed data format may also include data that is transformed by constructive transformation, destructive transformation, and/or structural transformation into the process format and/or structure. In some embodiments, constructive transformation of data may include adding data, replicating data, and the like. In some embodiments, destructive transformation of data may include fixing or removing incorrect, corrupted, incorrectly formatted, duplicate, or incomplete data within a dataset, and the like. In some embodiments, structural transformation of data may include moving and/or combining columns of data in a data set, and the like. The converting of data may include the processing, cleansing, standardizing, and categorizing of data into a cleansed data format for use in generating an accumulated artificial intelligence (AI) model. In an embodiment, the conversion of the condition datum 108 and the measured downhole conditions 116 may include the processing, cleansing, and standardizing of data into a data set and/or data bucket for use in generating an artificial intelligence model The conversion of data into a cleansed data format in the current disclosure may be consistent with the conversion of data into a cleansed data format disclosed in Non-provisional application Ser. No. 17/853,143 filed on Jun. 29, 2022 and entitled "APPARATUS AND METHOD FOR GENERATING A COMPILED ARTIFICIAL INTELLIGENCE (AI) MODEL," the entirety of which is incorporated herein by reference.

With continued reference to FIG. 1, processor 104 may be configured to identify a flagged data 124. As used in the current disclosure, "flagged data" is an element of data used to highlight downhole conditions. Flagged data 124 may be used to highlight abnormal conditions, mark the beginning or the end of a cycle, or any other points of interest that occur within down hole conditions. Flagged data 124 may be generated from wells that are similarly situated to the target well as a function of condition datum 108, this will be discussed in greater detail herein below. As used in the current disclosure, a "target well" is the well that apparatus 100 will predict the downhole conditions for. Flagged data, such as present flagged data, may be generated concurrently or shortly before the prediction of downhole conditions. Flagged data 124 may additionally include historical flagged data. As used in the current disclosure, "historical flagged data" is a flagged data 124 that was recorded prior to the prediction of downhole conditions. Historical flagged data may be recorded several days, months, or years prior to the current prediction of downhole conditions.

With continued reference to FIG. 1, flagged data 124 may comprise marking a segment of measured downhole conditions 116. A segment may comprise a reading of measured downhole conditions 116 over a predetermined period of time. Flagged data may highlight when a well is experiencing high/low temperature, pressure, viscosity, changes in pressure, changes in rate, or density of the output of the well. Flagged data 124 may include historical flagged data from the current well or flagged data 124 from a second well that is similarly situated to the current well as a function of condition datum 108. Wells that are similarly situated to the current well may include wells that are geographically similar by ground conditions to the current well or wells that are in the same or similar geographic region or area. Similarly situated wells may also comprise wells that share similar construction features, current operation datum, and/or system geometry. In non-limiting example, processor 104 may compare the measured downhole conditions 116 of three wells. The first well of the three wells has a pressure problem. The well went to completion, but the pressure response might be problematic if it occurs in the other wells. The remaining two wells produced relatively normal pressure. A flagged data 124 may mark the first well because of the unknown pressure response and the next two wells as a normal pressure response. In some embodiments, flagged data 124 may be generated by placing a flag at the start and end of the job. In some embodiments, flagged data 124 may be generated by placing flags at points of interest during the course of accumulating measured downhole conditions 116. Once the flagged data 124 is generated it may be sorted by type. In a non-limiting example, flags may be sorted between normal and abnormal pressure responses.

With continued reference FIG. 1, the flagged data 124 may be identified and sorted using a flag data classifier. A flagged data classifier may be consistent with the classifiers discussed herein below in FIG. 2. A Flagged data classifier may be configured to categorize flagged data 124. Categories may include normal reading, abnormal reading, high/low pressure readings, high/low temperature readings, high/low viscosity readings, geographic conditions, well conditions, and the like. A Flagged data classifier may be trained using flag training data. Flag training data may include flagged data 124, a plurality of categories, downhole conditions 116, and the like. Flagged training data may be configured to correlate flagged data 124 to a category of the plurality of categories. Flagged data classifier may include a K-nearest neighbors (KNN) algorithm, discussed in greater detail herein below.

With continued reference to FIG. 1, flagged data 124 may comprise a plurality of different flags. In an embodiment, flagged data 104 may be generated by plotting the current measured downhole conditions 116 of a well against the data from similarly situated wells. Processor 104 may be configured to mark flagged data 124, when there is significant deviation between the plot lines. In another embodiment, processor 104 may be configured to mark a segment of flagged data 124 when it recognizes a pattern within the measured downhole conditions 116. Patterns and or plotted data may be representative of various elements of downhole conditions 116 including but not limited to temperature, pressure, density, volume, of the output of the well. Patterns and/or plotted data may also be representative of hydrostatic pressures, formation pressures, fracture pressures, bottomhole pressures, formation integrity tests, equivalent circulating densities, differential pressures, and the like. Processor 104 may be configured to identify patterns by comparing them to past patterns within measured downhole conditions 116. Processor 104 may only compare similar elements of downhole conditions 116. For example, processor 104 may only compare downhole pressure to past downhole pressures, similarly it may only compare downhole temperatures to past downhole temperatures. Measured downhole conditions 116 may be displayed graphically or within a spreadsheet thus allowing a processor 104 compare the graphs to past graphs of measured downhole conditions 116. Processor 104 may then be configured to mark the beginning of the pattern and the end of pattern with flags.

With continued reference to FIG. 1, processor 104 may identify flagged data 124 using a downhole machine learning model 128. As used in the current disclosure, a "downhole machine learning model" is a mathematical and/or algorithmic representation of a relationship between inputs and outputs. Downhole machine learning model 128 may be similar to the machine learning model mentioned herein below in FIG. 2. In embodiments, a downhole machine learning model 128 may include a classifier, which may be consistent with the classifier disclosed with reference to FIG. 2. Inputs to the to the downhole machine learning model 128 may include condition datum 108, measured downhole conditions 116, and the like. Inputs to the downhole machine learning model 128 may additionally include cleansed condition datum and cleansed downhole measurement datum. The output of the downhole machine learning model 128 may include an identification of flagged data 124. Identification of flagged data 124 may include flagged data 124. Downhole machine learning model 128 may by trained using downhole training data. Downhole training data is a plurality of data entries containing a plurality of inputs that are correlated to a plurality of outputs for training a processor 104 by a machine-learning process. Downhole training data may be configured to correlate historical flagged data 124 and measured downhole conditions 116 to a flagged data 124. Downhole training data may include historical flagged data 124, measured downhole conditions 116, condition datum 108, and the like. Historical Flagged data may include any flagged data 124 that was collected prior to the current identification of flagged data 124. In some embodiments, historical flagged data may be generated manually, such as by humans. Downhole training data may be stored in a database, such as a training data database, or remote data storage device, or a user input or device.

Still referring to FIG. 1, processor may be configured to generate a machine learning model, such as downhole machine learning model 128, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor may be configured to generate a machine learning model, such as downhole machine learning model 128, using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number experience of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, processor 104 may generate a predicted downhole condition 132 as a function of the flagged data 124. As used in the current disclosure, a "predicted downhole condition" is a forecast of the downhole conditions on the target well. Predicted downhole conditions 132 may include a prediction of the changes in hydrostatic pressure, formation pressure, fracture pressure, bottomhole pressure, formation integrity test, equivalent circulating densities, differential pressure, bottomhole frac gradient, temperature, fluid density, and the like over a period of time. Predicted downhole conditions 132 may be generated using historical or present flagged data 124. In an embodiment, historical flagged data 124 may be compared to measured downhole conditions 116 to predict downhole conditions 132. In another embodiment, processor 104 may recognize a repeatable pattern within flagged data 124 and predict downhole conditions 132 based on the repeatable pattern. Processor 104 may compare flagged data 124 from a plurality of similarly situated wells to the measured downhole conditions 116 of the current well to generate predicted downhole conditions 132. Additionally, Processor 104 may compare flagged data 124 from a plurality of similarly situated wells to the flagged data 124 of the current well to generate predicted downhole conditions 132. In embodiments, predicted downhole conditions 132 may be generated without the use of measured downhole conditions 116 from the current well. Predictions of downhole conditions may be generated using a prediction machine learning model. In some embodiments, processor 104 may be configured to control equipment and/or equipment as a function of predicted downhole condition 132. In a non-limiting example, processor 104 may predict that the downhole conditions may cause damage the equipment and machinery, Processor 104 may be configured to remove the equipment until well conditions are operable for the equipment. In other embodiments, processor 104 may be configured to generate a faux predicted downhole condition as a function of mapping surface conditions to historical downhole conditions and/or cleansed measured downhole condition. Processor 104 may be configured to correlate surface conditions to historical downhole conditions to generate a faux predicted downhole condition. As used in the current disclosure, a "faux predicted downhole condition" is a more generalized prediction of down hole condition 132. In embodiments, a faux predicted downhole condition may be configured to be used as an input to a prediction machine learning model. The prediction machine learning model may be configured to produce a predicted downhole condition 132 as a function of faux predicted downhole condition and flagged data 124.

With continued reference to FIG. 1, a processor 104 may predict downhole conditions 132 using a using a lookup table. A "lookup table," for the purposes of this disclosure, is an array of data that maps input values to output values. A lookup table may be used to replace a runtime computation with an array indexing operation. In another non-limiting example, a downhole condition look up table may be able to correlate historical and present flagged data 124 and measured downhole conditions 116 to a predicted downhole conditions 132. Processor 104 may be configured to "lookup" one or more condition datum 108, flagged datum 124, measured downhole conditions 116, and the like, in order to find a corresponding predicted downhole condition 132.

With continued reference to FIG. 1, processor 104 may predict downhole conditions using an prediction machine learning model. As used in the current disclosure, a "prediction machine learning model" is a mathematical and/or algorithmic representation of a relationship between inputs and outputs. Prediction machine learning model may be similar to the machine learning model mentioned herein below in FIG. 2. In embodiments, a prediction machine learning model may include a classifier, which may be consistent with the classifier disclosed with reference to FIG. 2. Inputs to the to the prediction machine learning model may include historical and present flagged data 124, measured downhole conditions 116, condition datum 108, accuracy rating, examples of predicted downhole conditions, and the like. The output of the prediction machine learning model may include a prediction of downhole conditions 132. Prediction machine learning model may by trained using prediction training data. Prediction training data is a plurality of data entries containing a plurality of inputs that are correlated to a plurality of outputs for training a processor 104 by a machine-learning process. Prediction training data may be configured to correlated historical and present flagged data 124 and measured downhole conditions 116 to a predicted downhole condition 128. Prediction training data may include historical flagged data 124, measured downhole conditions 116, condition datum 108, examples of predictions of downhole conditions 132, and the like. Examples of prediction of downhole conditions may include any predicted downhole conditions 132 that was generated prior to the current prediction of downhole conditions 132. Predicted training data may be stored in a database, such as a training data database, or remote data storage device, or a user input or device.

With continued reference to FIG. 1, a machine learning model, such as prediction machine learning model, may be implemented as a fuzzy inferencing system. As used in the current disclosure, a "fuzzy inference" is a method that interprets the values in the input vector (i.e., flagged data 124 and measured downhole conditions 116) and, based on a set of rules, assigns values to the output vector. A fuzzy set may also be used to show degree of match between fuzzy sets may be used to rank one resource against another. For instance, if both excessive flagged data 124 and measured downhole conditions 116 have fuzzy sets, a predicted downhole condition 132 may be identified by having a degree of overlap exceeding a predetermined threshold.

Still referring to FIG. 1, processor 104 may be configured to generate an accuracy score as a function of the predicted downhole conditions 132. As used in the current disclosure, a "accuracy score" is a rating of the accuracy of the predicted downhole conditions 132. An accuracy score may be calculated on a numerical scale, for instance a scale from 1-10. In a non-limiting example, a score of 1 may be a very inaccurate prediction of downhole conditions 132 whereas a rating of 10 may be an extremely accurate prediction of downhole conditions. An accuracy score may score each prediction of downhole conditions 132. An accuracy score may be generated by comparing the predicted downhole conditions 132 from a well to the measured downhole conditions 116 of the same well. In a non-limiting example, the predicted downhole conditions 132 may be a temperature of 110 degrees at a depth of 3600 feet and the measured downhole conditions 116 may be a temperature of 113 degrees at a depth of 3600 feet. Processor 104 may compare the measured downhole conditions 116 to the predicted downhole conditions 132 to produce an accuracy score of 9 out of 10. In some embodiments, generating the accuracy score may include linear regression techniques. Processor 104 may be designed and configured to create a machine-learning model using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm mounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 1, processor 104 may generate a predicted reservoir condition as a function of the flagged data 124 and/. As used in the current disclosure, a "predicted reservoir condition" is a forecast of the reservoir conditions. A reservoir for the purposes of this disclosure may include both an oil and/or a gas reservoir. Examples of predicted reservoir conditions may include a prediction of the changes in temperature, pressure, force, motion, and the like within a reservoir over time. In an embodiment, predicted reservoir conditions may comprise a prediction of fluid state of the reservoir, temperature of the reservoir, depth, compensation, historical migration, type of geological trap, and reservoir heterogeneity, gas-oil ratio, fluid density, and the like. Predicted reservoir conditions may be generated using historical or present flagged data 124. In an embodiment, historical flagged data 124 may be compared to predicted downhole conditions 132 in order to predict reservoir conditions. In another embodiment, processor 104 may recognize a repeatable pattern within flagged data 124 and predict reservoir conditions on the repeatable pattern. Processor 104 may compare flagged data 124 from a plurality of similarly situated reservoirs to the predicted downhole conditions 132 of the current well to generate predicted reservoir conditions. Additionally, Processor 104 may compare flagged data 124 from a plurality of similarly situated reservoirs to the flagged data 124 of the current well to generate predicted reservoir conditions.

With continued reference to FIG. 1, a processor 104 may predict reservoir conditions using a using a lookup table. A "lookup table," for the purposes of this disclosure, is an array of data that maps input values to output values. A lookup table may be used to replace a runtime computation with an array indexing operation. In another non limiting example, a reservoir condition look up table may be able to correlate historical and present flagged data 124 and a predicted downhole condition 132 to a predicted reservoir condition. Processor 104 may be configured to "lookup" one or more condition datum 108, flagged datum 124, predicted downhole condition 132, and the like, in order to find a corresponding predicted reservoir condition.

With continued reference to FIG. 1, processor 104 may predict reservoir conditions using an reservoir machine learning model. As used in the current disclosure, a "reservoir machine learning model" is a mathematical and/or algorithmic representation of a relationship between inputs and outputs. Reservoir machine learning model may be similar to the machine learning model mentioned herein below in FIG. 2. In embodiments, a reservoir machine learning model may include a classifier, which may be consistent with the classifier disclosed with reference to FIG. 2. Inputs to the to the prediction machine learning model may include historical and present flagged data 124, measured downhole conditions 116, condition datum 108, predicted downhole conditions, examples of predicted reservoir conditions, and the like. The output of the prediction machine learning model may include a prediction of reservoir conditions. Reservoir machine learning model may by trained using reservoir training data. Reservoir training data is a plurality of data entries containing a plurality of inputs that are correlated to a plurality of outputs for training a processor 104 by a machine-learning process. Reservoir training data may be configured to correlate historical and present flagged data 124 and a predicted downhole condition 132 to a predicted reservoir condition. Reservoir training data may include historical flagged data 124, measured downhole conditions 116, condition datum 108, prediction of downhole conditions 132, and examples of a prediction of reservoir conditions. and the like. Examples of prediction of reservoir conditions may include any predicted reservoir conditions that was generated prior to the current prediction of reservoir conditions. Reservoir training data may be stored in a database, such as a training data database, or remote data storage device, or a user input or device.

Figure 2:
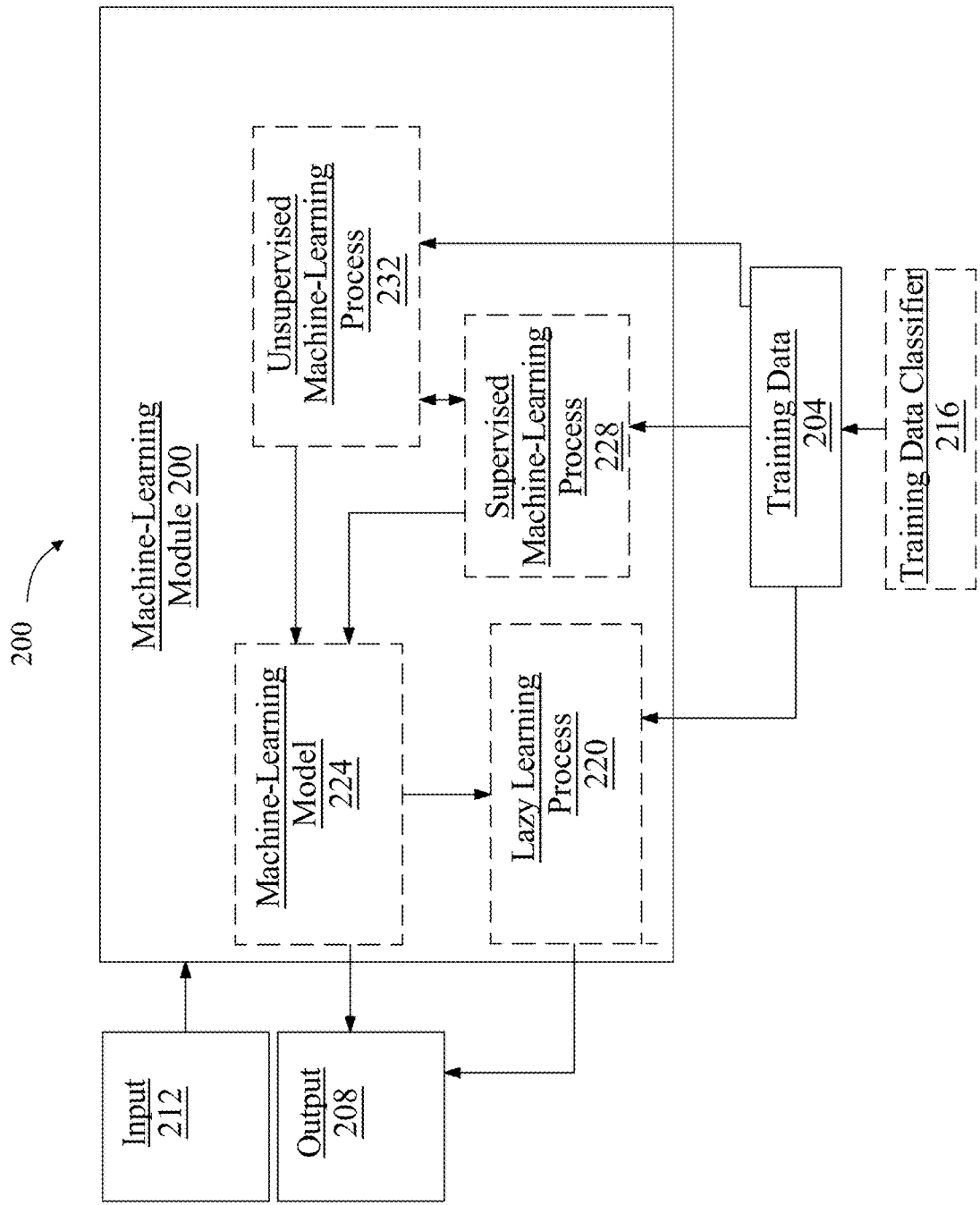
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include a flagged data 124 and measured downhole condition 116 as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

For example, and still referring to FIG. 2, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Figure 3:
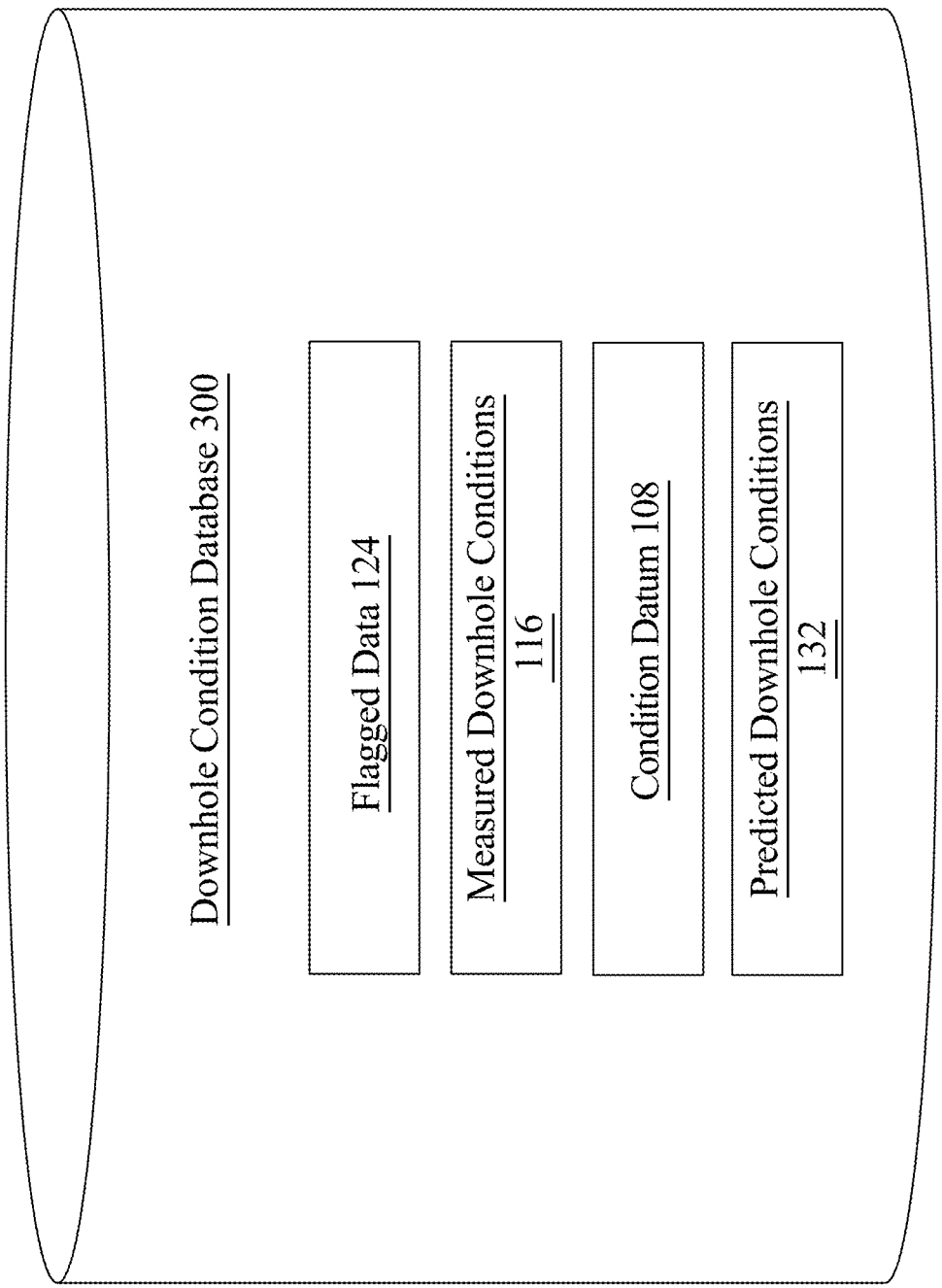
FIG. 3 is a block diagram of an exemplary embodiment of a downhole condition database.

Now referring to FIG. 3, an exemplary downhole condition database 300 is illustrated by way of block diagram. In an embodiment, flagged data 124, measured downhole conditions 116, condition datum 108, accuracy rating, predicted downhole conditions 132, predicted reservoir conditions, and/or the like may be stored in a downhole condition database 300 (also referred to as "database"). Processor 104 may be communicatively connected with downhole condition database 300. For example, in some cases, database 300 may be local to processor 104. Alternatively or additionally, in some cases, database 300 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. Downhole condition database 300 may be implemented, without limitation, as a relational database, a key-value retrieval database such as a NOSQL database, or any other format or structure for use as a database that a person skilled in the art would recognize as suitable upon review of the entirety of this disclosure. Downhole condition database 300 may alternatively or additionally be implemented using a distributed data storage protocol and/or data structure, such as a distributed hash table or the like. Downhole condition database 300 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 4:
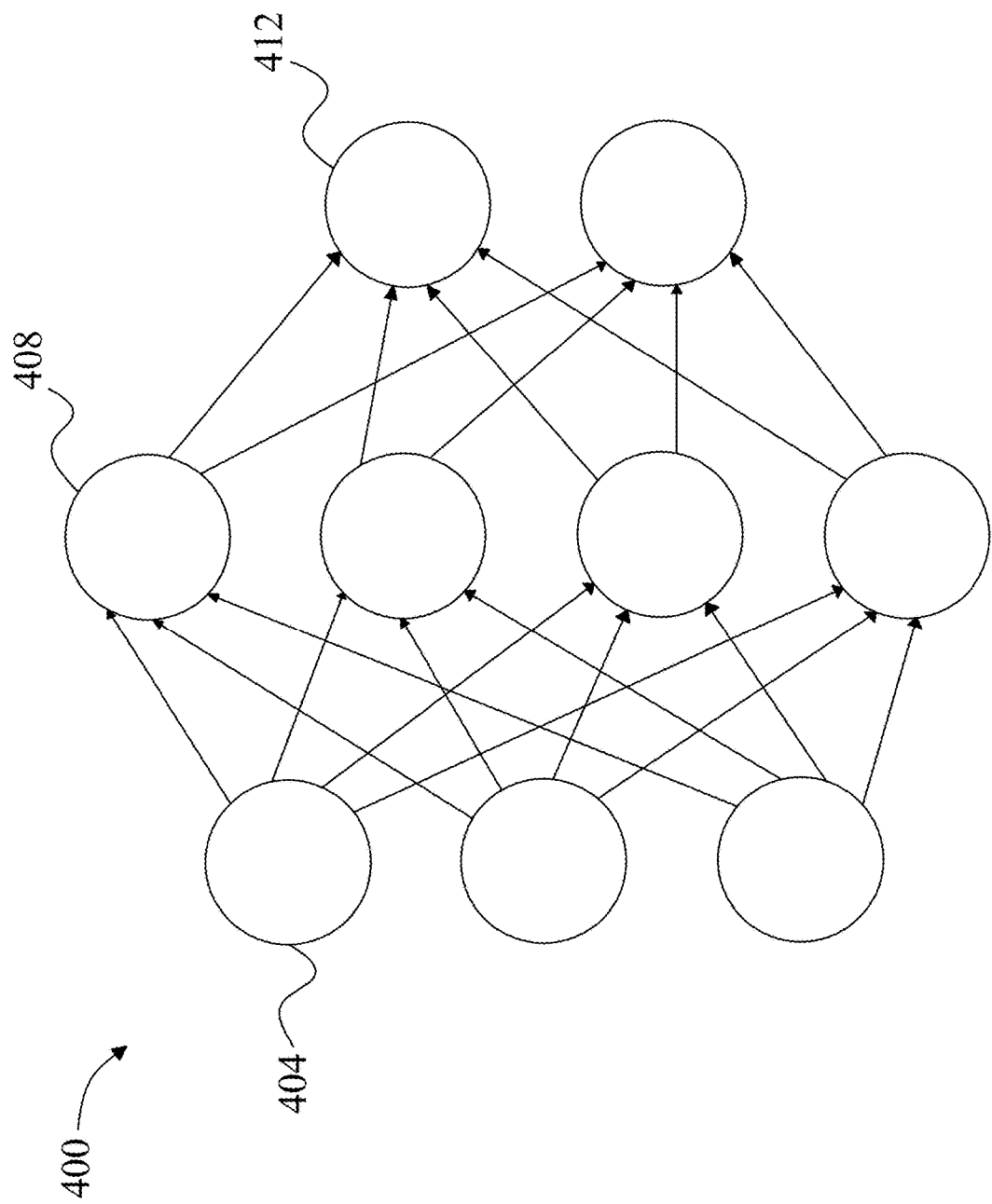
FIG. 4 is a diagram of an exemplary embodiment of neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
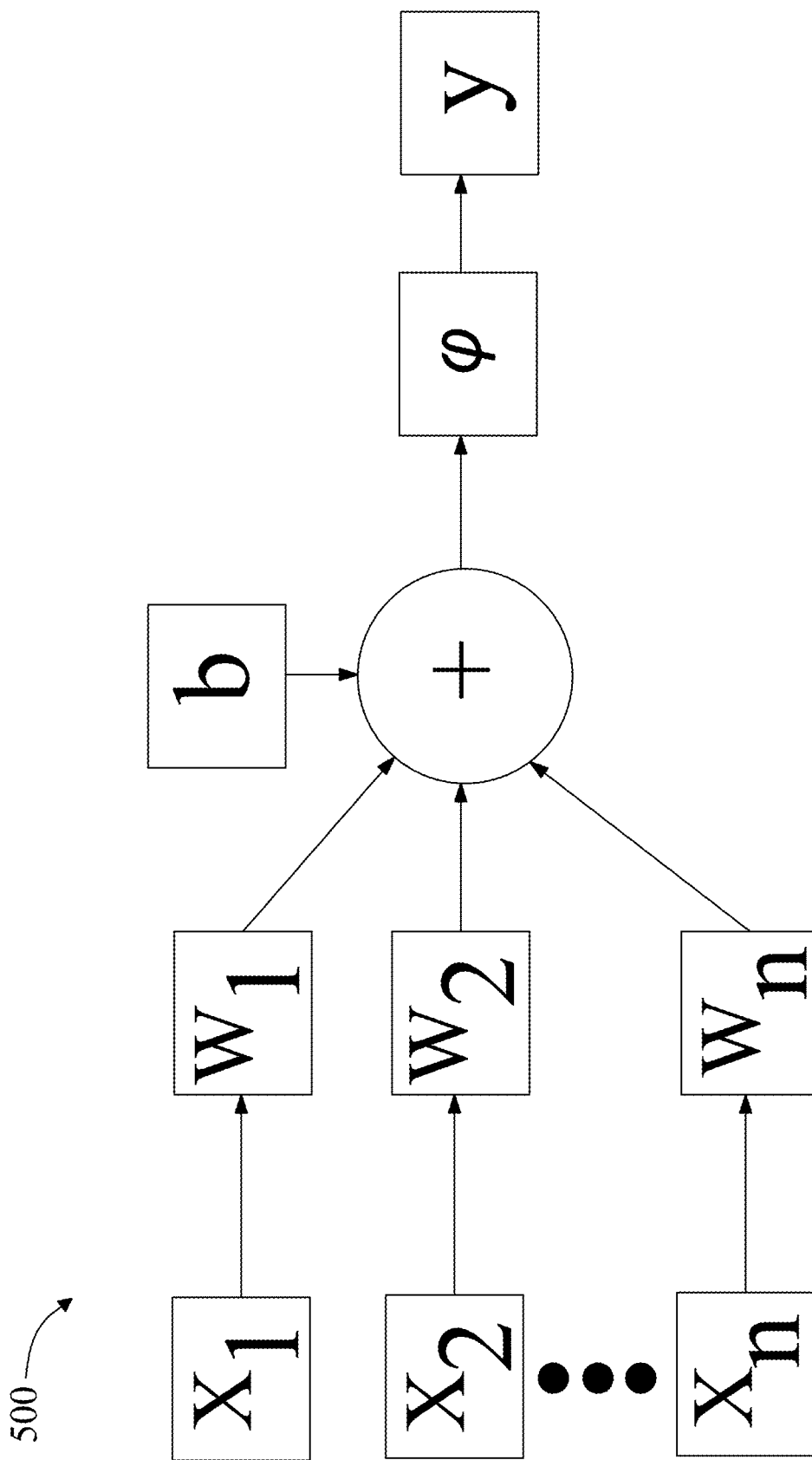
FIG. 5 is a diagram of an exemplary embodiment of a node of a neural network.

Referring now to FIG. 5, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
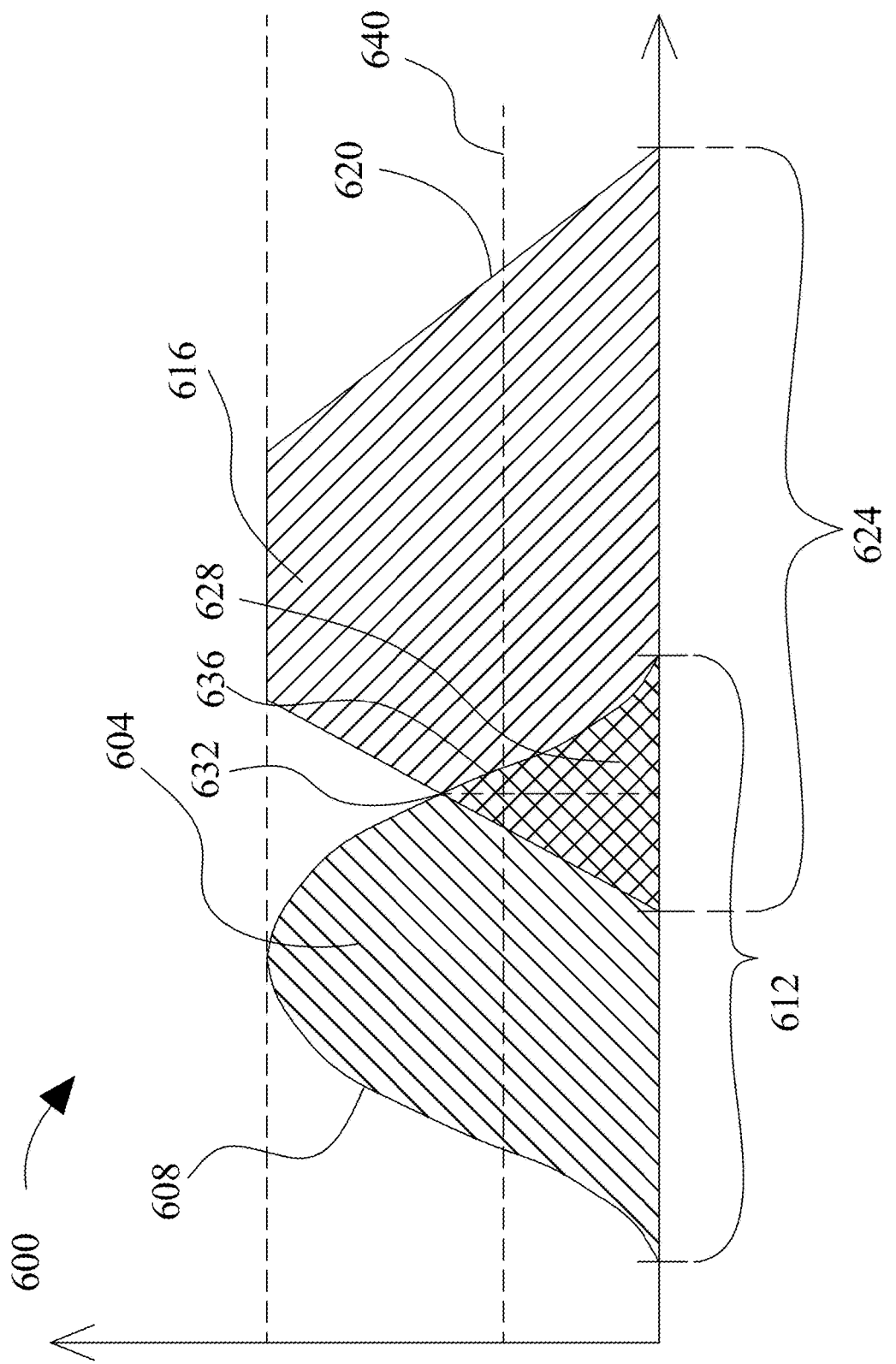
FIG. 6 is a graph illustrating an exemplary relationship between fuzzy sets.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent flagged data 124 and measured downhole conditions 116 from FIG. 1.

Alternatively or additionally, and still referring to FIG. 6, fuzzy set comparison 600 may be generated as a function of determining data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to an input and/or output of flagged data 124, predicted downhole conditions 132, and/or measured downhole conditions 116. For instance, an acceptance variable may represent a first measurable value pertaining to the classification of flagged data 124 to an predicted downhole conditions 132. Continuing the example, an output variable may represent predicted downhole conditions 132 specific the current well. In an embodiment, flagged data 124 and/or or measured downhole conditions 116 may be represented by their own fuzzy set. In other embodiments, predicted downhole conditions 132 specific to the user may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T (c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \le x < b \\ \frac{c-x}{c-b}, & \text{if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any software component datum, any source repository datum, any malicious quantifier datum, any predictive threshold datum, any string distance datum, any resource datum, any niche datum, and/or any combination of the above. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, an predicted downhole conditions 132 may indicate a sufficient degree of overlap with the action flagged data 124 and measured downhole conditions 116 for combination to occur as described above. There may be multiple thresholds; for instance, a second threshold may indicate an emergency due to a flagged data 124. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both flagged data 124 and measured downhole conditions 116 have fuzzy sets, a flagged data 124 may be classified as a measured downhole conditions 116 by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
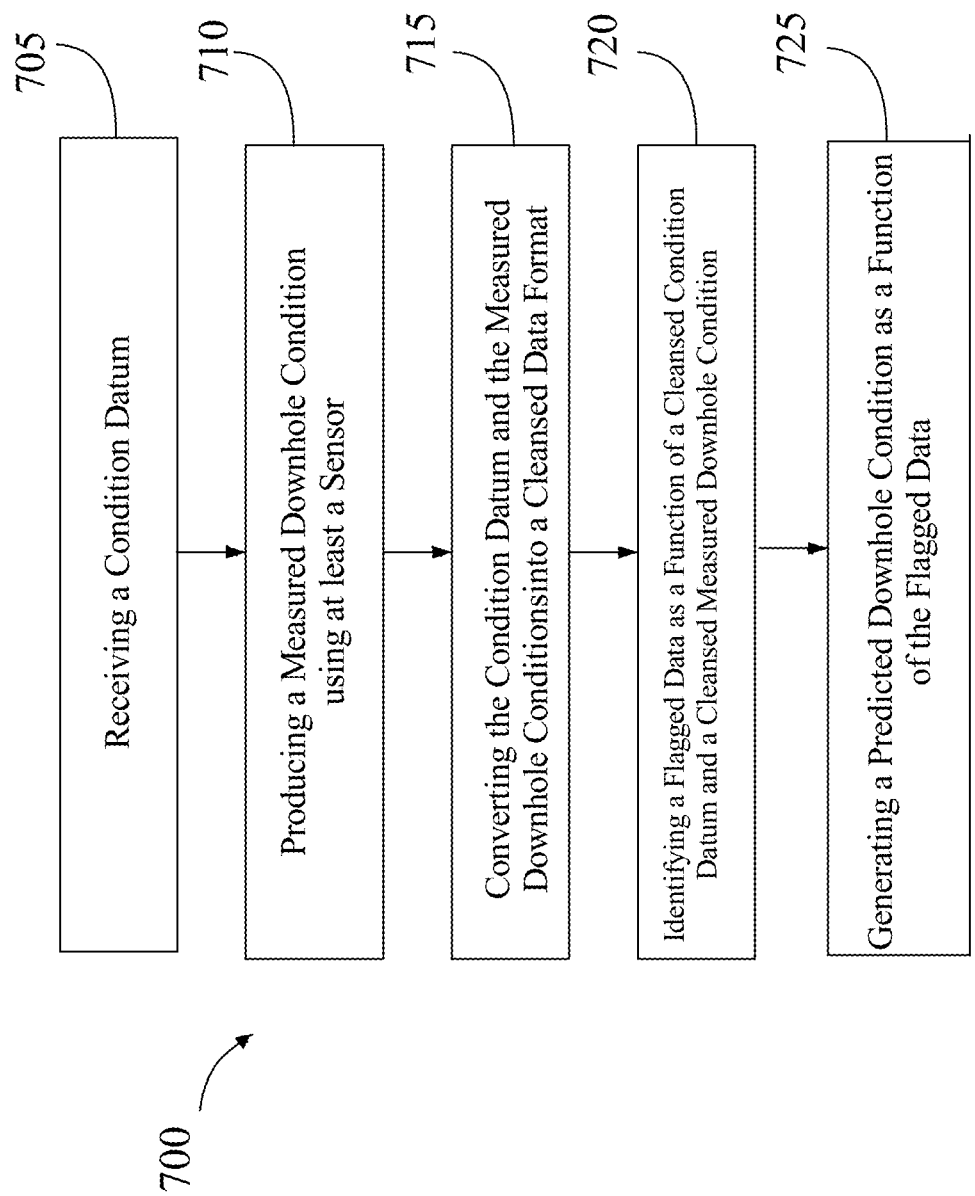
FIG. 7 is a flow diagram of an exemplary method for predicting downhole conditions.

Referring to FIG. 7, an exemplary method 700 for predicting downhole conditions is shown. Method 700 includes a step 705 of receiving, using at least a processor, a condition datum. This may be implemented in accordance with FIGS. 1-6. In an embodiment, the condition datum may comprise system geometry and/or a geographical datum.

Still referring to FIG. 7, method 700 incudes a step of 710 of producing, using the at least a processor, a measured downhole condition using at least a sensor. This may be implemented in accordance with FIGS. 1-6.

Still referring to FIG. 7, method 700 includes a step of 715 of converting, using the at least a processor, the condition datum and the measured downhole conditions into a cleansed data format using a data conversion module, wherein the cleansed data format comprises a cleansed condition datum and a cleansed measured downhole condition. This may be implemented in accordance with FIGS. 1-6.

Still referring to FIG. 7, method 700 includes a step of 720 of identifying, using the at least a processor, a flagged data as a function of the cleansed condition datum and the cleansed measured downhole conditions using a downhole machine learning model. This may be implemented in accordance with FIGS. 1-6.

Still referring to FIG. 7, method 700 includes a step of 725 of generating, using the at least a processor, a predicted downhole condition as a function of the flagged data. This may be implemented in accordance with FIGS. 1-6. In an embodiment, the predicted downhole conditions may be using a prediction machine learning model. In another embodiment, the predicted downhole conditions may comprise bottomhole pressure and/or frac gradient.

Still referring to FIG. 7. the method may include a step of generating a predicted reservoir conditions as a function of the flagged data. This may be implemented in accordance with FIGS. 1-6. The predicted reservoir conditions may be generated using a reservoir machine learning model. The method may include a step of generating, using the at least a processor, an accuracy score as a function of the prediction of downhole conditions. This may be implemented in accordance with FIGS. 1-6. In embodiments, the accuracy score may comprise a comparison of the measured downhole conditions to the prediction of the downhole conditions It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
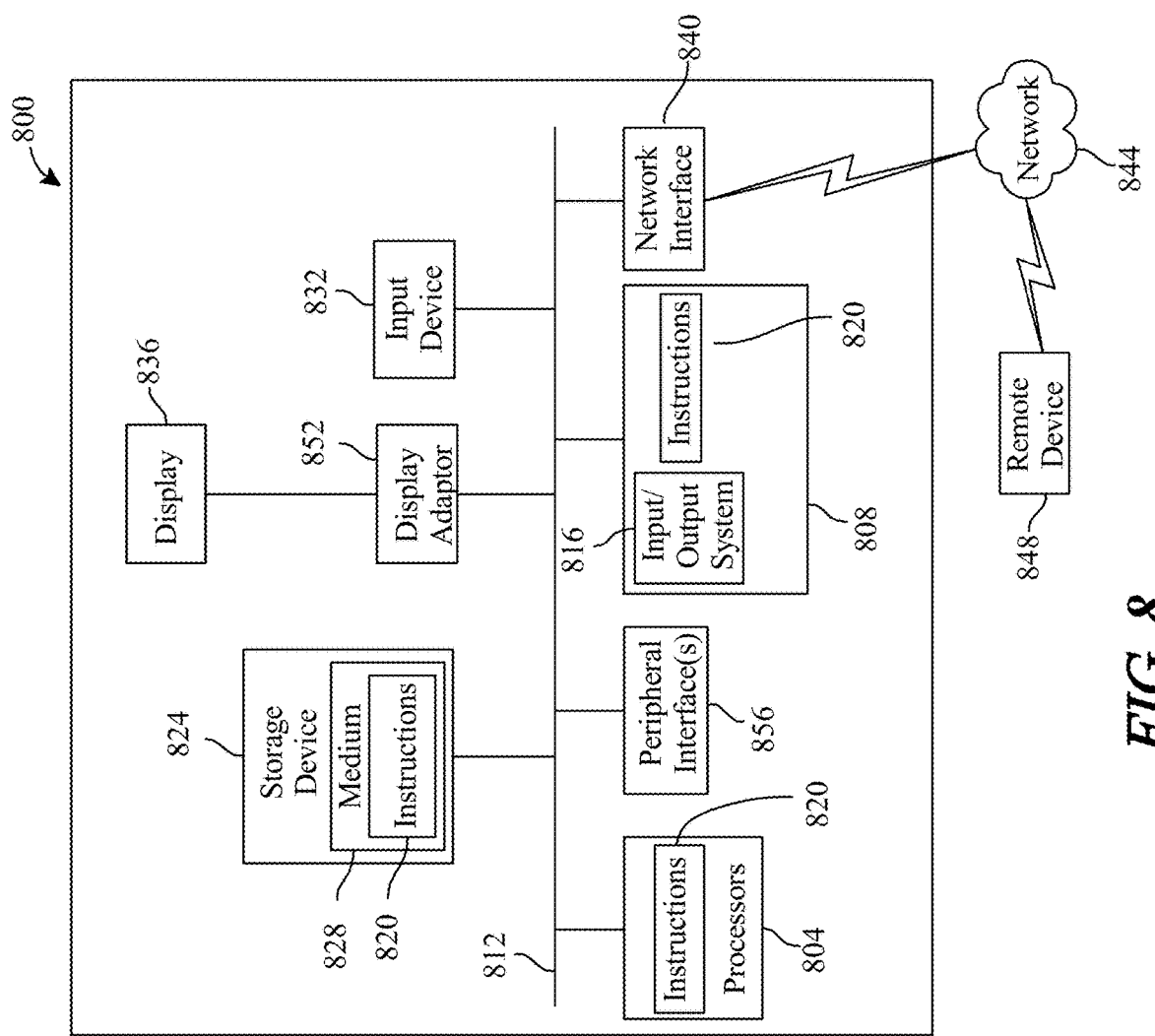
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for predicting downhole conditions, wherein the apparatus comprises:
   at least a processor; and
   a memory communicatively connected to the at least a processor, the memory containing instructions configuring the at least a processor to:
      receive a condition datum, wherein the condition datum comprises one or more surface conditions near a well;
      produce a measured downhole condition using at least a sensor, wherein the downhole condition comprises one or more downhole conditions within the well;
      convert the condition datum and the measured downhole conditions into a cleansed data format using a data conversion module, wherein the cleansed data format comprises a cleansed condition datum and a cleansed measured downhole condition;
      identify flagged data as a function of the cleansed condition datum and the cleansed measured downhole condition, wherein identifying the flagged data comprises:
         identifying similarly situated wells, wherein identifying the similarly situated wells comprises correlating the measured downhole condition to a plurality of wells as a function of a database;
         generating downhole training data, wherein the downhole training data comprises a plurality of data entries including historical flagged data and downhole conditions correlated to flagged data, wherein generating the downhole training data comprises recording the historical flagged data by measuring previous downhole conditions of the similarly situated wells over a predetermined period of time, and selecting the downhole training data using a training data classifier;
         training a downhole machine learning model as a function of the downhole training data, wherein training the downhole machine leaning model comprises:
            inputting training data to an input layer of nodes, wherein the training data comprises at least the cleansed condition datum and cleansed measured downhole condition inputs, and wherein the downhole machine learning model further comprises one or more intermediate layers of nodes and an output layer of nodes comprising a plurality of flagged data outputs;
            adjusting one or more connections and one or more weights between nodes in adjacent layers of the downhole machine learning model;
            generating an accuracy score as a function of a predicted downhole condition;
            comparing the accuracy score to a threshold;
            updating the downhole training data as a function of the comparison; and
            iteratively retraining the downhole machine learning model using the updated downhole training data;
         generating the flagged data as a function of the downhole machine learning model, wherein the downhole machine learning model is configured to receive the cleansed condition datum and the cleansed measured downhole condition as inputs and output the flagged data;
      generate the predicted downhole condition of the well as a function of the flagged data;
      control equipment of the apparatus as a function of the predicted downhole condition; and
      generate a predicted reservoir condition as a function of the flagged data by:
         generating reservoir training data correlating historical and present flagged data and a predicted downhole condition to predicted reservoir conditions using an array indexing operation configured to optimize a runtime computation of the at least a processor;
         training a reservoir machine learning model using the reservoir training data; and
         outputting, using the reservoir machine learning model, the predicted reservoir condition.

2. The apparatus of claim 1, wherein the predicted downhole condition is generated using a prediction machine learning model.

3. The apparatus of claim 1, wherein the predicted downhole condition comprises a bottomhole pressure.

4. The apparatus of claim 1, wherein the predicted downhole condition comprises a bottomhole frac gradient.

5. The apparatus of claim 1, wherein the accuracy score comprises a comparison of the measured downhole conditions to the predicted downhole condition.

6. The apparatus of claim 1, wherein the condition datum comprises system geometry.

7. The apparatus of claim 1, wherein the condition datum comprises a geographical datum.

8. A method for predicting downhole conditions, wherein the method comprises:
   receiving, using at least a processor, a condition datum, wherein the condition datum comprises one or more surface conditions near a well;
   producing, using the at least a processor, a measured downhole condition using at least a sensor, wherein the downhole condition comprises one or more downhole conditions within the well;
   converting, using the at least a processor, the condition datum and the measured downhole conditions into a cleansed data format using a data conversion module, wherein the cleansed data format comprises a cleansed condition datum and a cleansed measured downhole condition;
   identifying, using the at least a processor, a flagged data as a function of the cleansed condition datum and the cleansed measured downhole condition, wherein identifying flagged data comprises:
      identifying similar situated wells, wherein identifying similarly situated wells comprises correlating the measured downhole condition to a plurality of wells as a function of a database;
      generating downhole training data, wherein downhole training data comprises a plurality of data entries including historical flagged data and downhole conditions correlated to flagged data, wherein generating the downhole training data comprises recording the historical flagged data by measuring previous downhole conditions of the similarly situated wells over a predetermined period of time, and selecting the downhole training data using a training data classifier;

training a downhole machine learning model as a function of the downhole training data, wherein training the downhole machine leaning model comprises:
    inputting training data to an input layer of nodes, wherein the training data comprises at least the cleansed condition datum and cleansed measured downhole condition inputs, and wherein the downhole machine learning model further comprises one or more intermediate layers of nodes and an output layer of nodes comprising a plurality of flagged data outputs;
    adjusting one or more connections and one or more weights between nodes in adjacent layers of the downhole machine learning model;
    generating an accuracy score as a function of a predicted downhole condition;
    comparing the accuracy score to a threshold;
    updating the downhole training data as a function of the comparison; and
    iteratively retraining the downhole machine learning model using updated downhole training data;
generating the flagged data as a function of the downhole machine learning model, wherein the downhole machine learning model is configured to receive the condition datum and the measured downhole condition as inputs and outputs the flagged data;
generating, using the at least a processor, the predicted downhole condition of the well as a function of the flagged data;
controlling equipment of the apparatus as a function of the predicted downhole condition; and
generating, using the at least a processor, a predicted reservoir condition as a function of the flagged data by:
generating reservoir training data correlating historical and present flagged data and a predicted downhole condition to predicted reservoir conditions using an array indexing operation configured to optimize a runtime computation of the at least a processor;
training a reservoir machine learning model using the reservoir training data; and
outputting, using the reservoir machine learning model, the predicted reservoir condition.

9. The method of claim 8, wherein the predicted downhole condition is generated using a prediction machine learning model.

10. The method of claim 8, wherein the predicted downhole condition comprises a bottomhole pressure.

11. The method of claim 8, wherein the predicted downhole condition comprises a bottomhole frac gradient.

12. The method of claim 8, wherein the accuracy score comprises a comparison of the measured downhole conditions to the predicted downhole condition.

13. The method of claim 8, wherein the condition datum comprises system geometry.

14. The method of claim 8, wherein the condition datum comprises a geographical datum.

* * * * *